June 13, 1939.　　　M. W. WILSON　　　2,162,685
ELECTRIC GENERATING PLANT
Filed Dec. 30, 1938
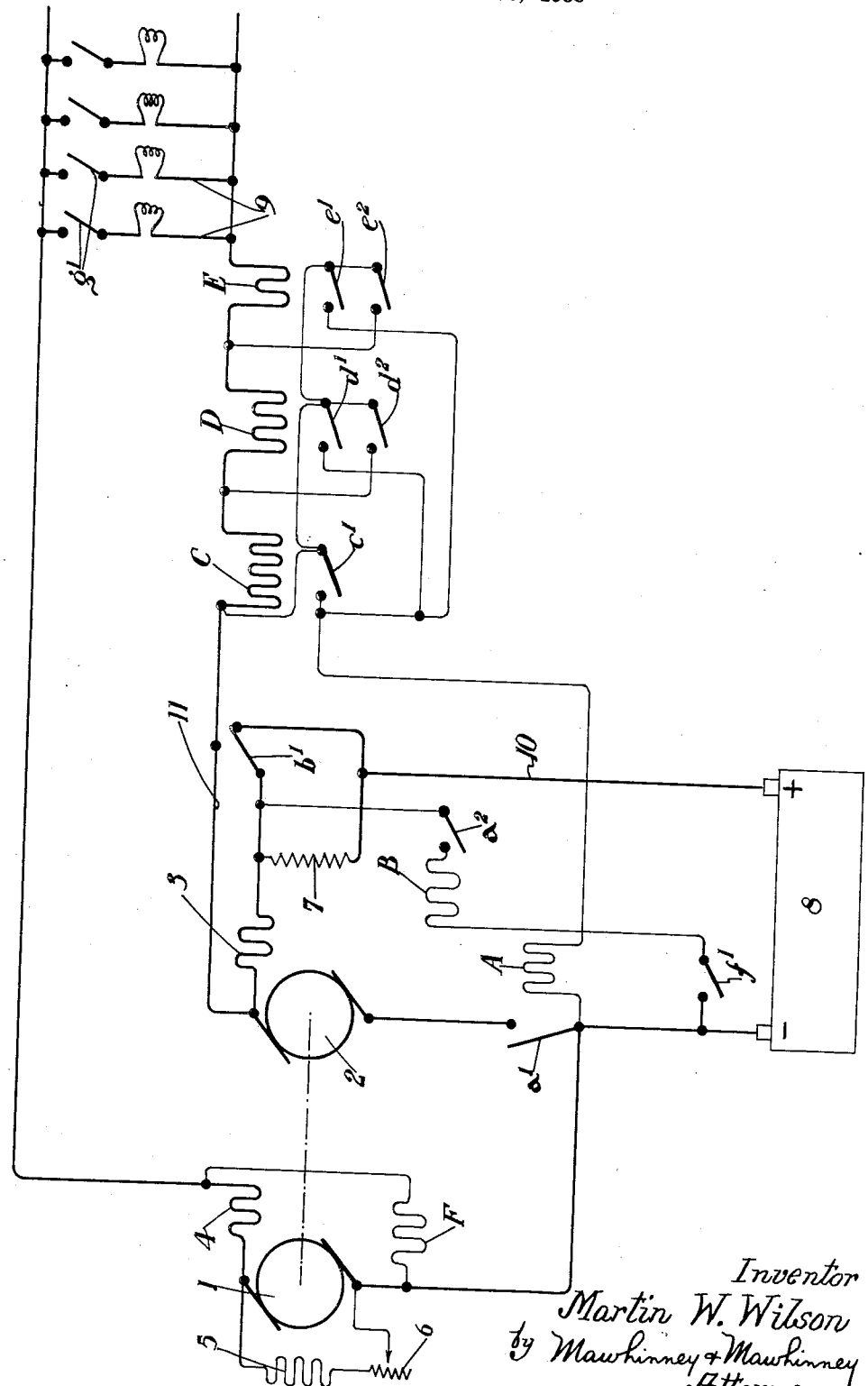

Patented June 13, 1939

2,162,685

UNITED STATES PATENT OFFICE 2,162,685

ELECTRIC GENERATING PLANT

Martin Westbury Wilson, Dursley, England, assignor to R. A. Lister & Company Limited, Dursley, England Application December 30, 1938, Serial No. 248,600
In Great Britain January 12, 1938

5 Claims. (Cl. 290—30)

This invention relates to electric generating plant, particularly for domestic use, where the prime-mover is an internal-combustion engine which is automatically started up by one part of a two-part generator as soon as a predetermined load is imposed on the battery.

It has already been proposed, in British patent specification No. 364,238 (United States patent to Abbink Spaink 1,903,712 granted April 11, 1933), that a "running" series field winding should be used, by means of a starting contactor, as a "starting" shunt field winding for a low-voltage armature winding of the two-part generator. In this way a very strong magnetic field is created on starting, but it is almost completely destroyed at the time of switching off the "starting" shunt field winding, with the result that, if the load comprises lamps, these first become incandescent and then suddenly cut out, only becoming incandescent again after a delay.

The main object is to avoid this difficulty. A further object is to avoid having to adjust one field winding to give desirable characteristics both as a "running" series winding and as a "starting" shunt winding.

Broadly speaking, the invention consists in separating, in the two-part generator, the "starting" and "running" field windings so that each may be calculated and adjusted to serve one purpose only. In this way when the load includes a lamp, the latter will be illuminated with a steadily-increasing brilliance up to the maximum, during starting up of the plant, without any flickering or other undesirable feature.

Electric generating plant, according to the invention, includes a "running" compound field winding, a "starting" series field winding, and a load-responsive relay means which on energization effects the energization of a starting contactor arranged so that one of the armature windings (i. e., the low-voltage one) and the "starting" series field winding will be thereby connected across the battery for starting purposes, after which both the armature windings coact to supply current at the predetermined voltage to the load circuit in the known manner.

The single figure of the accompanying drawing is a diagrammatic arrangement according to the invention.

In the circuit illustrated, the two armature windings 1, 2 are mechanically arranged for rotation in unison, being, for example, wound on the same rotor, and they are mechanically connected for rotation in unison with a prime-mover the illustration of which is here omitted. 3 represents a "starting" series field winding, 4 a "running" series winding, 5 a "running" shunt field winding and 6 a rheostat therefor. 7 is a "charging" resistance for the battery 8. A is a starting contactor having two sets of normally-open contacts $a^1$, $a^2$. B is a relay for short-circuiting the "starting" series field winding 3, having contacts $b^1$. C, D and E represent a plurality of load-responsive relays with their windings in series with the load circuit 9 and of different numbers of turns so as to ensure operation when the load only includes, say, one lamp. F is a cut-off relay having normally-open contacts $f^1$.

The usual protective devices, ammeters and voltmeter, and, if desired, an auxiliary load and control gear therefor, are omitted in the arrangement illustrated for the sake of simplicity.

The various contacts are shown in the positions occupied by them when there is no load. On closure of any load circuit switch $g^1$ the load circuit is supplied from the battery 8 by the lead 10, the contacts $b^1$, the "starting" series field winding 3, the lead 11 and the windings of the load-responsive relays C, D and E. At least the first of these (having the greater number of turns) operates to close its associated contacts $c^1$ to complete a circuit for the winding of the starting contactor A. (As the voltage generated increases it is necessary to short-circuit the winding of the first relay C, which is effected by the contacts $d^2$ when the second relay D operates, the contacts $d^1$ then maintaining a circuit for the winding of the starting contactor A. In a similar way the operation of the third relay E short-circuits the windings of the relays C and D at its contacts $e^2$, maintaining a circuit for the winding of the starting contactor A at the contacts $e^1$.) Thereupon the contacts $a^1$ and $a^2$ are closed to connect the low-voltage armature winding 2 and the "starting" series field winding 3 directly across the battery, and to prepare a circuit for the winding of the relay B. At the same time provision is made in any convenient manner for automatically turning on the fuel for the prime-mover (if this is a compression-ignition engine) and for carrying out other starting operations in connection therewith.

The prime-mover on accelerating causes both armature windings to generate forward current in a known manner, the voltage impressed upon the load being equal to the sum of the two armature winding voltages.

When the voltage generated by the high voltage armature winding 1 reaches a predetermined value the relay F responds thereto to close its contacts $f^1$, thus completing the circuit for the winding of the relay B. It thereby throws over its contact $b^1$ to the other position. In these conditions the "starting" series field winding 3 is short-circuited, and charging current is supplied to the battery by way of the lead 11, the contacts $b^1$ and the resistance 7.

On the disconnection of the load the previously-energized load-responsive relay becomes de-energized, thus disconnecting the winding of the starting contactor A which therefore opens its contacts $a^1$ and $a^2$ to disconnect the low-voltage armature winding 2 and the winding of the relay B. The contact $b^1$ therefore returns to the position shown in the drawing ready for when the generating plant is next to be started. At the same time the prime-mover is operated by means not shown to shut down.

Thus, by means of the invention, the plant can be automatically started up in a very simple manner and if the load is a lighting one the lamps will be steadily brought to full incandescence without any flickering.

What I claim as my invention and desire to secure by Letters Patent of the United States is:—

1. Electric generating plant, of the kind where the prime-mover is an internal-combustion engine which is automatically started up by one part of a two-part generator as soon as a predetermined load is imposed on the battery, including a two-part generator having a "running" compound field winding and, in addition, a "starting" field winding, a starting contactor, and a load-responsive relay means which on energization effects the energization of the starting contactor, the latter being arranged so that one of the armature windings and the "starting" field winding will be thereby connected across the battery for starting purposes, after which both the armature windings coact to supply current at a predetermined voltage to the load circuit in the known manner.

2. Electric generating plant, of the kind where the prime-mover is an internal-combustion engine which is automatically started up by the low-voltage winding of a two-part generator as soon as a predetermined load is imposed on the battery, the generator having also a high-voltage winding, including, for the generator, a "running" compound field winding and, in addition, a "starting" field winding, and including also a starting contactor, a load-responsive relay means which on energization effects the energization of the starting contactor, the latter being arranged so that the low-voltage armature winding and the "starting" field winding will be thereby connected across the battery for starting purposes, and a relay operative when the high-voltage armature winding generates a sufficient voltage to short-circuit the "starting" field winding, after which both the armature windings coact to supply current at a predetermined voltage to the load circuit.

3. Electric generating plant, of the kind where the prime-mover is an internal-combustion engine which is automatically started up by one part of a two-part generator as soon as a predetermined load is imposed on the battery, including a two-part generator having a "running" compound field winding and, in addition, a "starting" field winding, a starting contactor, a load-responsive relay means which on energization effects the energization of the starting contactor, the latter being arranged so that one of the armature windings and the "starting" field winding will be thereby connected across the battery for starting purposes, and a relay means operative when the voltage generated by the other armature winding reaches a predetermined value to short circuit the "starting" field winding, after which both the armature windings coact to supply current at a predetermined voltage to the load circuit in the known manner.

4. Electric generating plant, according to claim 3, characterized in that said last-mentioned relay means, when operating at the said predetermined voltage, also introduces a charging resistance into the battery circuit.

5. Electric generating plant including a prime-mover, a generator having high and low voltage armature windings, a "running" compound field winding, and a "starting" field winding, and including a battery, a starting contactor, a load-responsive relay means which on energization effects the energization of the starting contactor, the latter being arranged so that the low-voltage armature winding and the "starting" field winding will be thereby connected across the battery for starting up the prime-mover, a second relay means having its winding connected across the high-voltage armature winding, and a third relay means controlled by said second relay means and operative for short-circuiting the "starting" field winding and for introducing a charging resistance into the battery circuit when the voltage across the high-voltage armature winding reaches a predetermined value, after which both the armature windings coact to supply current at a predetermined voltage to the load circuit.

MARTIN W. WILSON.